United States Patent
Kuffner et al.

(10) Patent No.: US 10,507,577 B2
(45) Date of Patent: Dec. 17, 2019

(54) METHODS AND SYSTEMS FOR GENERATING INSTRUCTIONS FOR A ROBOTIC SYSTEM TO CARRY OUT A TASK

(71) Applicant: X Development LLC, Mountain View, CA (US)

(72) Inventors: James Joseph Kuffner, Mountain View, CA (US); Jared Stephen Russell, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 232 days.

(21) Appl. No.: 15/720,584

(22) Filed: Sep. 29, 2017

(65) Prior Publication Data

US 2018/0056505 A1   Mar. 1, 2018

Related U.S. Application Data

(63) Continuation of application No. 14/804,621, filed on Jul. 21, 2015, now Pat. No. 9,802,309.

(Continued)

(51) Int. Cl.
*B25J 9/16* (2006.01)
*B25J 9/00* (2006.01)
*G06N 3/00* (2006.01)

(52) U.S. Cl.
CPC ............ *B25J 9/0084* (2013.01); *G06N 3/008* (2013.01); *Y10S 901/47* (2013.01)

(58) Field of Classification Search
CPC . B25J 9/16; B25J 9/1602; B25J 9/1605; B25J 9/1628; B25J 9/163; B25J 9/1656;
(Continued)

(56) References Cited

U.S. PATENT DOCUMENTS 7,463,948 B2   12/2008   Atsuo
8,214,079 B2    7/2012   Han
(Continued)

FOREIGN PATENT DOCUMENTS

CN   1487871 A    4/2004
CN   1877475 A   12/2006
(Continued)

OTHER PUBLICATIONS

International Search Report for corresponding PCT application No. PCT/US2015/041704, dated Oct. 6, 2015.

*Primary Examiner* — Adam R Mott
(74) *Attorney, Agent, or Firm* — McDonnell Boehnen Hulbert & Berghoff LLP

(57) ABSTRACT

Example embodiments may relate to robot-cloud interaction. In particular, a cloud-based service may receive a query from a first robotic system including sensor data, a request for instructions to carry out a task, and information associated with a configuration of the first robotic system. The cloud-based service may then identify stored data including a procedure previously used by a second robotic system to carry out the task and information associated with a configuration of the second robotic system. The cloud-based service may then generate instructions for the first robotic system to carry out the task based at least in part on the sensor data, the procedure used by the second robotic system to carry out the task, the information associated with the configuration of the first robotic system, and the information associated with the configuration of the second robotic system.

20 Claims, 7 Drawing Sheets

Related U.S. Application Data

(60) Provisional application No. 62/028,389, filed on Jul. 24, 2014.

(58) Field of Classification Search
CPC .......... B25J 9/1671; B25J 9/0084; G05B 2219/40089; G05B 2219/40093; G05B 2219/40095; G05B 2219/40096; G06N 3/008
See application file for complete search history.

(56) References Cited

U.S. PATENT DOCUMENTS

| | | | |
|---|---|---|---|
| 8,380,349 B1* | 2/2013 | Hickman | ............ G05D 1/0246 700/247 |
| 8,380,652 B1 | 2/2013 | Francis | |
| 8,386,079 B1 | 2/2013 | Kohler | |
| 8,433,442 B2 | 4/2013 | Justin-Marl | |
| 8,447,863 B1 | 5/2013 | Francis | |
| 8,639,644 B1 | 1/2014 | Hickman | |
| 2006/0195598 A1* | 8/2006 | Fujita | ...................... H04L 29/06 709/230 |
| 2007/0021868 A1* | 1/2007 | Nagatsuka | ............ B25J 9/1674 700/245 |
| 2010/0010968 A1 | 1/2010 | Reidlich | |
| 2012/0165978 A1 | 6/2012 | Chun | |
| 2013/0085602 A1* | 4/2013 | Fung | ...................... B25J 11/003 700/245 |
| 2013/0166621 A1 | 6/2013 | Dingju | |

FOREIGN PATENT DOCUMENTS

| | | |
|---|---|---|
| CN | 101413806 A | 4/2009 |
| CN | 101953172 A | 1/2011 |
| CN | 103079657 A | 5/2013 |

* cited by examiner

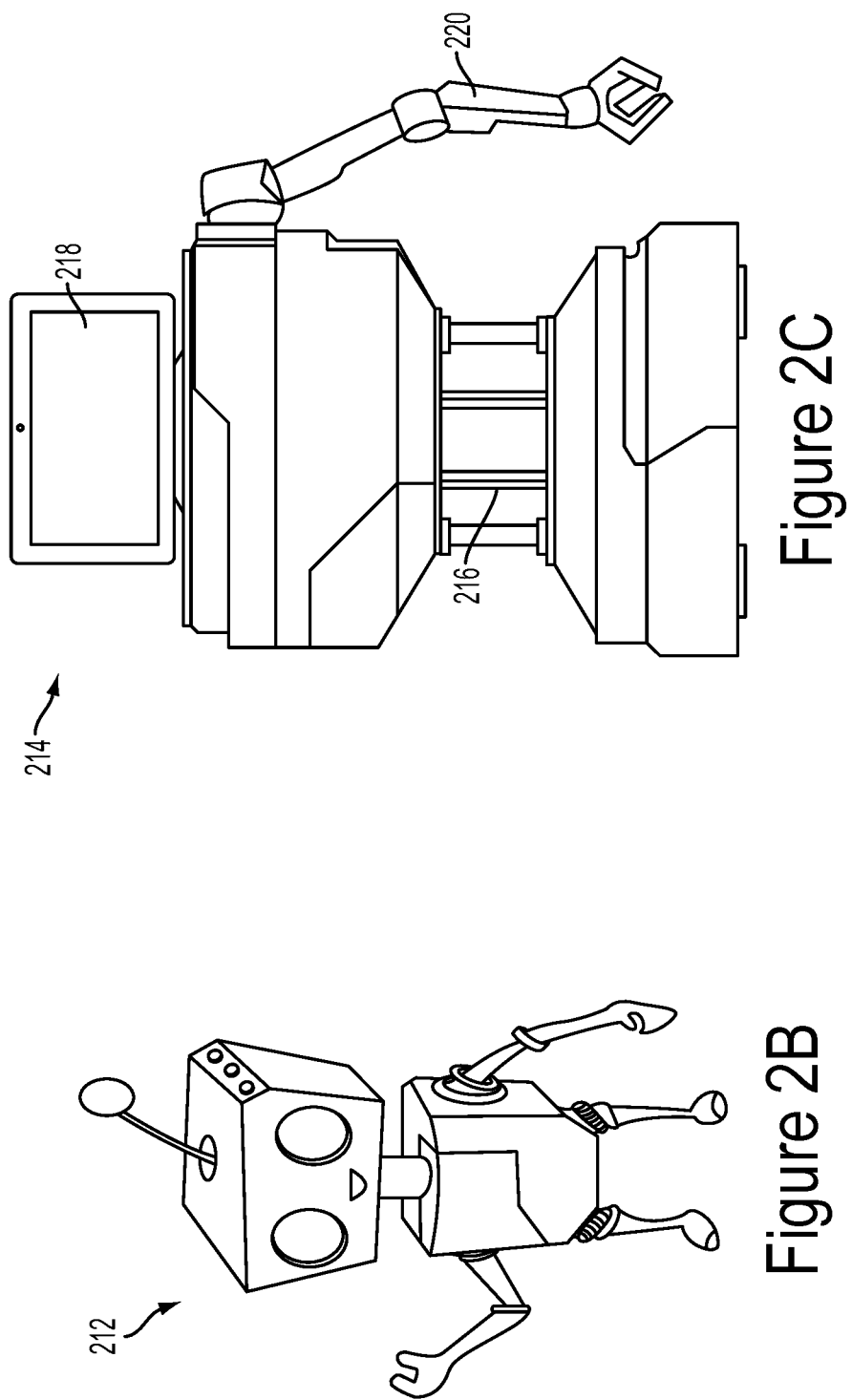

METHODS AND SYSTEMS FOR GENERATING INSTRUCTIONS FOR A ROBOTIC SYSTEM TO CARRY OUT A TASK

CROSS REFERENCE TO RELATED APPLICATION

The present application claims priority to U.S. patent application Ser. No. 14/804,621, filed on Jul. 21, 2015 and entitled "Methods and Systems for Generating Instructions for a Robotic System to Carry Out a Task," which is hereby incorporated by reference in its entirety. U.S. patent application Ser. No. 14/804,621 then claims priority to U.S. Provisional patent application Ser. No. 62/028,389 filed on Jul. 24, 2014 and entitled "Methods and Systems for Generating Instructions for a Robotic System to Carry Out a Task," which is hereby incorporated by reference in its entirety.

BACKGROUND

Unless otherwise indicated herein, the materials described in this section are not prior art to the claims in this application and are not admitted to be prior art by inclusion in this section.

Cloud computing refers to a provision of computational resources via a computer network. In a traditional model of computing, both data and software are fully contained on a user's computer. In cloud computing, however, the user's computer may contain relatively little software or data (perhaps a minimal operating system and web browser, for example), and may serve as a display terminal for processes occurring on a network of computers. A common shorthand provided for a cloud computing service (or even an aggregation of existing cloud services) is "the cloud".

Cloud computing has been referred to as "client-server computing", however, there may be distinctions between general cloud computing and client-server computing. For example, client-server computing may include a distributed application structure that partitions tasks or workloads between providers of a resource or service (e.g., servers), and service requesters (e.g., clients). Client-server computing generally involves a one-to-one relationship between the server and the client, whereas cloud computing includes generic services that can be accessed by generic clients (e.g., a one-to-one relationship or connection may not be required). Thus, cloud computing generally includes client-server computing, and additional services and functionality.

Cloud computing may free users from certain hardware and software installation and maintenance tasks through use of simpler hardware on the user's computer that accesses a vast network of computing resources (e.g., processors, hard drives, etc.). Sharing of resources may reduce cost to individuals. Thus, any computer connected to the cloud may be connected to the same pool of computing power, applications, and files. Users can store and access personal files such as music, pictures, videos, and bookmarks or play games or use productivity applications on a remote server rather than physically carrying around a storage medium, such as a DVD or thumb drive.

In one example, a user may open a browser and connect to a host of web servers that run user interface software for collecting commands from the user and interpreting the commands into commands on the servers. The servers may handle the computing, and can either store or retrieve information from database servers or file servers and display an updated page to the user. Through "cloud computing", data across multiple servers can be synchronized around the world allowing for collaborative work on one file or project by multiple users around the world, for example.

SUMMARY

Example embodiments may relate to methods and systems involving a cloud-based service for assisting robotic systems with environment perception and interaction. In particular, the cloud-based service may interact with a robotic system via a communication network to receive information from the robotic system as well as to send information to the robotic system. Such a configuration may reduce (or eliminate) the need for additional on-board memory and processing power on the robotic system in order to carry out certain tasks by the robotic system. Additionally, the cloud-based service may allow for data sharing among multiple robotic systems. Further, the cloud-based service may be continuously updated as robotic systems obtain information from the environment.

For instance, a robotic system may interact with the cloud-based service to receive instructions that allow the robotic system to carry out tasks. The cloud-based service may conduct large-scale simulations to generate the instructions based on various factors. Such factors may include sensor data received from the robotic system, previous procedures used by other robotic systems to carry out the task (or a similar task), and/or the configuration of the robotic system, among others.

In one aspect, a method is provided. The method involves receiving a query from a first robotic system having one or more sensors, where the query includes sensor data obtained from the one or more sensors, a request for instructions to carry out a task, and information associated with a configuration of the first robotic system. The method also involves identifying stored data including a procedure previously used by a second robotic system to carry out the task or a similar task and information associated with a configuration of the second robotic system. The method additionally involves generating, by one or more processors, instructions for the first robotic system to carry out the task based at least in part on the sensor data, the procedure used by the second robotic system to carry out the task or the similar task, the information associated with the configuration of the first robotic system, and the information associated with the configuration of the second robotic system. The method further involves sending, to the first robotic system, the generated instructions and a command to execute an on-board simulation, prior to carrying out the task, based on the generated instructions. The method yet further involves receiving results of the on-board simulation from the first robotic system and responsively determining a confidence measure, based on the results, related to a measure that the generated instructions allow for successful performance of the task. The method yet further involves generating, by the one or more processors, updated instructions to carry out the task, by the first robotic system, based on the confidence measure being below a threshold.

In another aspect, a non-transitory computer readable medium is provided. The non-transitory computer readable medium has stored therein instructions executable by one or more processors to cause a computing system to perform functions. The functions include receiving a query from a first robotic device having a plurality of sensors, where the query includes sensor data obtained from the plurality of sensors, a request for instructions to carry out a task, and information associated with a configuration of the first robotic device. The functions also include identifying stored data including a procedure previously used by a second robotic device to carry out the task or a similar task and information associated with a configuration of the second robotic device. The functions additionally include generating instructions for the first robotic device to carry out the task based at least in part on the sensor data, the procedure used by the second robotic device to carry out the task or the similar task, the information associated with the configuration of the first robotic device, and the information associated with the configuration of the second robotic device. The functions further include sending, to the first robotic device, the generated instructions and a command to execute an on-board simulation, prior to carrying out the task, based on the generated instructions. The functions yet further include receiving results of the on-board simulation from the first robotic device and responsively determining a confidence measure, based on the results, related to a measure that the generated instructions allow for successful performance of the task. The functions yet further include generating updated instructions to carry out the task, by the first robotic device, based on the confidence measure being below a threshold.

In yet another aspect, a second method is provided. The second method involves receiving a query from a first robotic system having one or more sensors, where the query includes sensor data obtained from the one or more sensors, a request for instructions to carry out an environment interaction, and information associated with a configuration of the first robotic system. The second method also involves identifying stored data including a procedure previously used by a second robotic system to carry out the environment interaction and information associated with a configuration of the second robotic system. The second method additionally involves generating instructions for the first robotic system to carry out the environment interaction based at least in part on the sensor data, the procedure used by the second robotic system to carry out the environment interaction, the information associated with the configuration of the first robotic system, and the information associated with the configuration of the second robotic system. The second method further involves conducting an iterative procedure until a confidence measure is above a threshold, where the confidence measure is related to a measure that the generated instructions allow for successful performance of the environment interaction, and where iterations of the iterative procedure include: sending, to the first robotic system, the generated instructions and a command to execute an on-board simulation, prior to carrying out the environment interaction, based on the generated instructions. Iterations of the iterative procedure also include: receiving results of the on-board simulation from the first robotic system and responsively determining the confidence measure based on the results. Iterations of the iterative procedure additionally include: updating the generated instructions to carry out the environment interaction, by the first robotic system, based on the confidence measure being below the threshold.

These as well as other aspects, advantages, and alternatives will become apparent to those of ordinary skill in the art by reading the following detailed description, with reference where appropriate to the accompanying drawings.

BRIEF DESCRIPTION OF THE DRAWINGS

FIG. 2B illustrates a graphical example of a robot, according to an example embodiment.

FIG. 2C illustrates another graphical example of a robot, according to an example embodiment.

DETAILED DESCRIPTION

Figure 1:
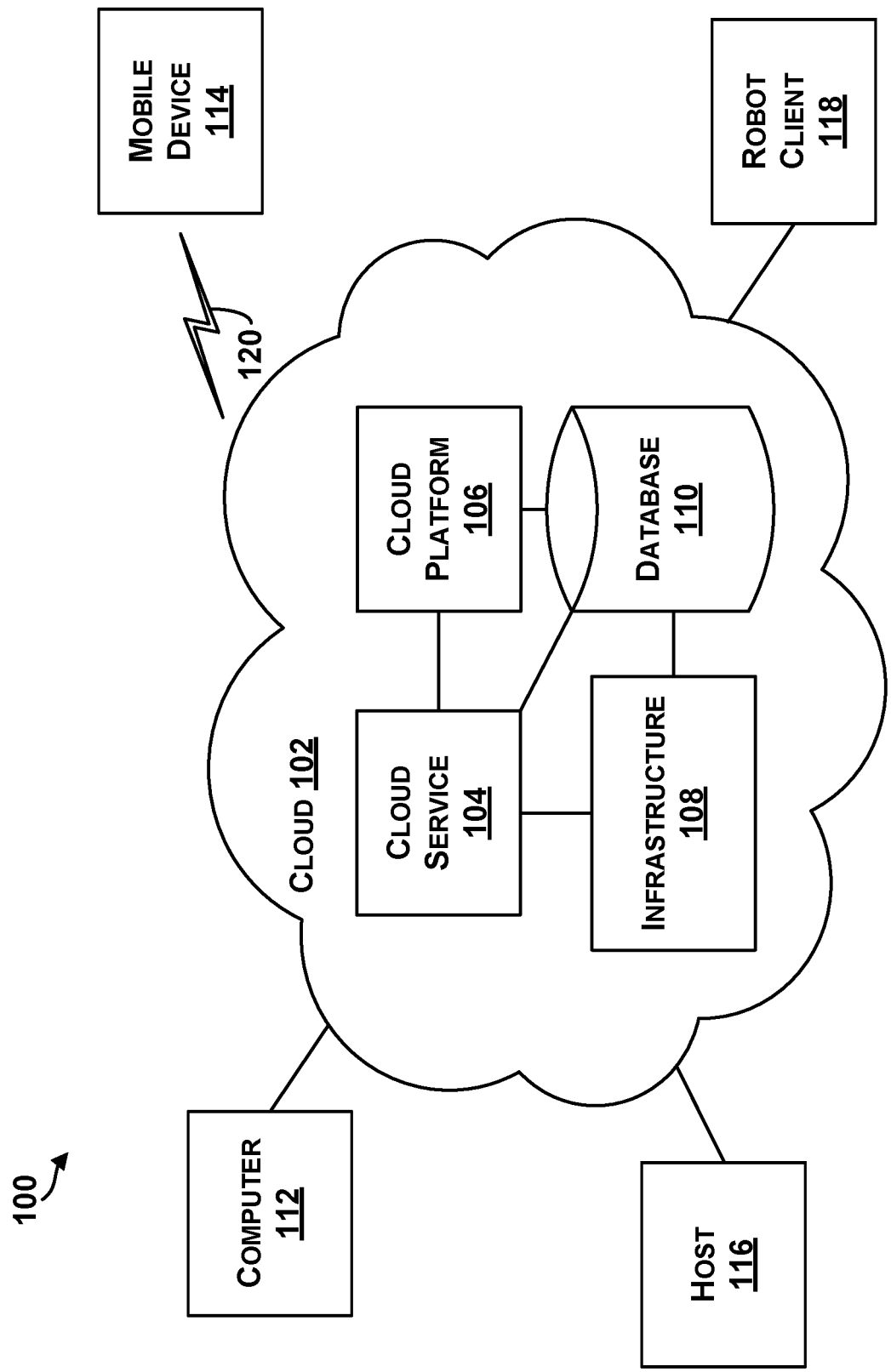
FIG. 1 illustrates an example system for cloud-based computing, according to an example embodiment.

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. OVERVIEW

According to various embodiments described herein, inter alia, are methods and systems for robot cloud computing. Within examples, cloud-based computing generally refers to networked computer architectures in which application execution and storage may be divided, to some extent, between client and server devices. A robot may be any device that has a computing ability and interacts with its surroundings with an actuation capability (e.g., electromechanical capabilities). A client device may be configured as a robot including various sensors and devices in the forms of modules, and different modules may be added or removed from a robot depending on requirements. In some examples, a robot may be configured to receive a second device, such as a mobile phone, that may be configured to function as an accessory or a "brain" of the robot.

In examples described herein, a robot may interact with the cloud to perform any number of actions, such as to share information with other cloud computing devices. Within examples, a robot may interact with the cloud to facilitate object recognition, to perform a mapping function, or to perform navigational functions (i.e., receive a map/navigation pathway previously traversed by another robot). In other examples, a robot may interact with the cloud to perform mapping of objects in an area, to perform inventory of objects, and to perform voice recognition by and/or control of a robot. A robot may perform any actions or queries to the cloud as described herein based on contextual or situational information.

In some examples, rather than require a robot's knowledge base to be stored onboard the robot, some embodiments enable robots to store and access data at an external location, such as on a server and/or other computing device. The external location may receive data and/or or requests from one or more robots. A server may store received data from one or more robots and/or distribute all or part of the stored data to one or more robots so as to create a common knowledge base amongst the robots, where robots can obtain instructions and/or data.

In some embodiments, a robot may have information relating to an object and/or area in which the robot operates. The area may be associated with a map, location, etc. The robot may send the information relating to the area to a server, which may include an object recognition system to identify objects associated with the information from the robot.

The robot and/or server may use contextual analysis to determine and identify objects. For example, if the robot is in an office, the robot may access an "office" database of objects to perform recognitions. As another example, the robot may operate with situational awareness such that a robot may inventory objects in a scene, and if given a command by a user, the robot can determine the content or interpret the meaning of the command based on a situation of the scene or by comparing with objects in the scene. For example, the robot may receive a command to retrieve a soda from the refrigerator. The robot may send the command to the server as an input or may optionally use the robot's database of the area to recognize the refrigerator and the soda, for example. Optionally, the robot may send the command to the server, which may recognize the refrigerator and the soda. In embodiments, the robot and/or server may use contextual as well as situational data to recognize the object. Moreover, once the object is recognized, the server may determine an interaction associated with the command and identify one or more computer executable instructions that the robot may execute to perform the interaction, for example.

II. EXAMPLE ARCHITECTURE FOR ROBOT-CLOUD INTERACTION

Referring now to the figures, FIG. 1 is an example system 100 for cloud-based computing. Cloud-based computing generally refers to networked computer architectures in which application execution and storage may be divided, to some extent, between client and server devices. A "cloud" may refer to a service or a group of services accessible over a network (e.g., Internet) by client and server devices, for example.

In one example, any computer connected to the cloud may be connected to the same pool of computing power, applications, and files. Thus, cloud computing enables a shared pool of configurable computing resources (e.g., networks, servers, storage, applications, and services) that can be provisioned and released with minimal management effort or service provider interaction. Users can store and access personal files such as music, pictures, videos, and bookmarks or play games or use productivity applications on a remote server rather than physically carrying around a storage medium.

As an example, in contrast to a predominately client-based or server-based application, a cloud-based application may store copies of data and/or executable program logic at remote server devices, while allowing client devices to download at least some of this data and program logic as needed for execution at the client devices. In some examples, downloaded data and program logic can be tailored to capabilities of specific client devices (e.g., a personal computer, tablet, or mobile phone, or robot) accessing the cloud based application. In addition, dividing application execution and storage between the client and server devices allows more processing to be performed by the server devices, thereby taking advantage of the server devices' processing power and capability, for example.

Cloud-based computing can also refer to distributed computing architectures in which data and program logic for a cloud-based application are shared between one or more client devices and/or server devices on a near real-time basis. Parts of this data and program logic may be dynamically delivered, as needed or otherwise, to various clients accessing the cloud-based application. Details of the architecture may be transparent to users of client devices. Thus, a PC user or robot client device accessing a cloud-based application may not be aware that the PC or robot downloads program logic and/or data from the server devices, or that the PC or robot offloads processing or storage functions to the server devices, for example.

In FIG. 1, a cloud 102 includes a cloud service 104, a cloud platform 106, a cloud infrastructure 108, and a database 110. The cloud 102 may include more or fewer components, and each of the cloud service 104, the cloud platform 106, the cloud infrastructure 108, and the database 110 may comprise multiple elements as well. Thus, one or more of the described functions of the system 100 may be divided into additional functional or physical components, or combined into fewer functional or physical components. In some further examples, additional functional and/or physical components may be added to the examples illustrated by FIG. 1. Delivery of cloud computing may involve multiple cloud components communicating with each other over application programming interfaces, such as web services and three-tier architectures, for example.

The cloud 102 may represent a networked computer architecture, and in one example, the cloud service 104 represents a queue for handling requests from client devices. The cloud platform 106 may include a frontend of the cloud and may be coupled to the cloud service 104 to perform functions to interact with client devices. The cloud platform 106 may include applications used to access the cloud 102 via a user interface, such as a web browser. The cloud infrastructure 108 may include service application of billing components of the cloud 102, and thus, may interact with the cloud service 104. The database 110 may represent storage capabilities by the cloud 102, and thus, may be accessed by any of the cloud service 104, the cloud platform 106, and/or the infrastructure 108.

The system 100 includes a number of client devices coupled to or configured to be capable of communicating with components of the cloud 102. For example, a computer 112, a mobile device 114, a host 116, and a robot client 118 are shown coupled to the cloud 102. Of course, more or fewer client devices may be coupled to the cloud 102. In addition, different types of client devices may be coupled to the cloud 102. For example, any of the client devices may generally comprise a display system, memory, and a processor.

The computer 112 may be any type of computing device (e.g., PC, laptop computer, etc.), and the mobile device 114 may be any type of mobile computing device (e.g., laptop, mobile telephone, cellular telephone, etc.).

The host 116 may be any type of computing device with a transmitter/receiver including a laptop computer, a mobile telephone, etc., that is configured to transmit/receive data to/from the cloud 102.

The robot client 118 may comprise any computing device that has connection abilities to the cloud 102 and that has an actuation capability (e.g., electromechanical capabilities). A robot may further be a combination of computing devices. In some examples, the robot 118 may collect data and upload the data to the cloud 102. The cloud 102 may be configured to perform calculations or analysis on the data and return processed data to the robot client 118. In some examples, as shown in FIG. 1, the cloud 102 may include a computer that is not co-located with the robot client 118. In other examples, the robot client 118 may send data to a second client (e.g., computer 112) for processing.

Any of the client devices may include additional components. For example, the robot client 118 may include one or more sensors, such as a gyroscope or an accelerometer to measure movement of the robot client 118. Other sensors may further include any of Global Positioning System (GPS) receivers, infrared sensors, sonar, optical sensors, biosensors, Radio Frequency identification (RFID) systems, Near Field Communication (NFC) chip, wireless sensors, and/or compasses, among others, for example.

In addition, any of the client devices may include an integrated user-interface (UI) that allows a user to interact with the device. For example, the robot client 118 may include various buttons and/or a touchscreen interface that allow a user to provide input. As another example, the robot client device 118 may include a microphone configured to receive voice commands from a user. Furthermore, the robot client 118 may include one or more interfaces that allow various types of user-interface devices to be connected to the robot client 118.

In FIG. 1, communication links between client devices and the cloud 102 may include wired connections, such as a serial or parallel bus. Communication links may also be wireless links, such as link 120, which may include Bluetooth, IEEE 802.11 (IEEE 802.11 may refer to IEEE 802.11-2007, IEEE 802.11n-2009, or any other IEEE 802.11 revision), or other wireless based communication links.

In other examples, the system 100 may include access points through which the client devices may communicate with the cloud 102. Access points may take various forms, for example, an access point may take the form of a wireless access point (WAP) or wireless router. As another example, if a client device connects using a cellular air-interface protocol, such as a CDMA or GSM protocol, an access point may be a base station in a cellular network that provides Internet connectivity via the cellular network.

As such, the client devices may include a wired or wireless network interface through which the client devices can connect to the cloud 102 (or access points). As an example, the client devices may be configured use one or more protocols such as 802.11, 802.16 (WiMAX), LTE, GSM, GPRS, CDMA, EV-DO, and/or HSPDA, among others. Furthermore, the client devices may be configured to use multiple wired and/or wireless protocols, such as "3G" or "4G" data connectivity using a cellular communication protocol (e.g., CDMA, GSM, or WiMAX, as well as for "WiFi" connectivity using 802.11). Other examples are also possible.

Figure 2A:
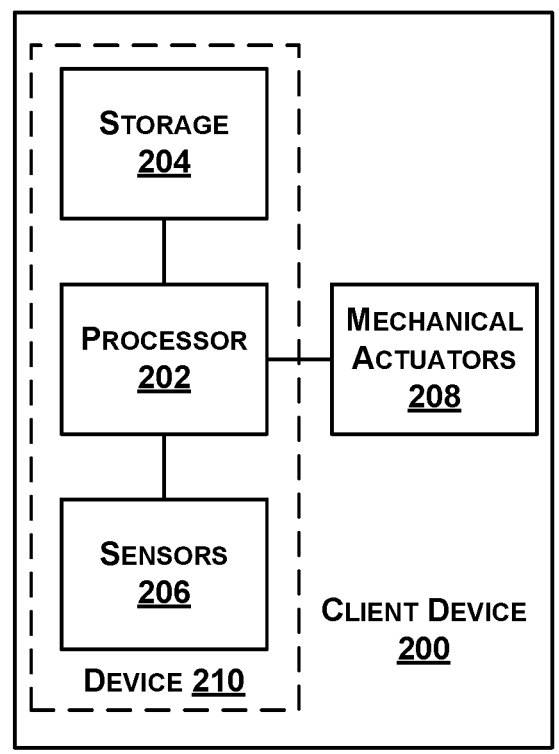
FIG. 2A illustrates an example client device, according to an example embodiment.

FIG. 2A illustrates an example client device 200. In one example, the client device 200 is configured as a robot. In some examples, a robot may contain computer hardware, such as a processor 202, memory or storage 204, and sensors 206. For example, a robot controller (e.g., processor 202, computing system, and sensors 206) may all be custom designed for a specific robot. The robot may have a link by which the link can access cloud servers (as shown in FIG. 1).

A wired link may include, for example, a parallel bus or a serial bus such as a Universal Serial Bus (USB). A wireless link may include, for example, Bluetooth, IEEE 802.11, Cellular (such as GSM, CDMA, UMTS, EV-DO, WiMAX, or LTE), or Zigbee, among other possibilities.

In one example, the storage 204 may be used for compiling data from various sensors 206 of the robot and storing program instructions. The processor 202 may be coupled to the storage 204 and may be configured to control the robot based on the program instructions. The processor 202 may also be able to interpret data from the various sensors 206 on the robot. Example sensors may include, smoke sensors, light sensors, radio sensors, infrared sensors, microphones, speakers, gyroscope, accelerometer, a camera, radar, capacitive sensors and touch sensors, etc.

The client device 200 may also have components or devices that allow the client device 200 to interact with its environment. For example, the client device 200 may have mechanical actuators 208, such as motors, wheels, movable arms, etc., that enable the client device 200 to move or interact with the environment.

In some example, various sensors and devices on the client device 200 may be modules. Different modules may be added or removed from a client device 200 depending on requirements. For example, in a low power situation, a robot may have fewer modules to reduce power usages. However, additional sensors may be added as needed. To increase an amount of data a robot may be able to collect, additional sensors may be added, for example.

In some examples, the client device 200 may be configured to receive a device, such as device 210, that includes the processor 202, the storage 204, and the sensors 206. For example, the client device 200 may be a robot that has a number of mechanical actuators (e.g., a movable base), and the robot may be configured to receive a mobile telephone, smartphone, tablet computer, etc. to function as the "brains" or control components of the robot. The device 210 may be considered a module of the robot. The device 210 may be physically attached to the robot. For example, a smartphone may sit on a robot's "chest" and form an interactive display. The device 210 may provide a robot with sensors, a wireless link, and processing capabilities, for example. The device 210 may allow a user to download new routines for his or her robot from the cloud. For example, a laundry folding routine may be stored on the cloud, and a user may be able to select this routine using a smartphone to download the routine from the cloud, and when the smartphone is placed into or coupled to the robot, the robot would be able to perform the downloaded action.

In some examples, the client device 200 may be coupled to a mobile or cellular telephone to provide additional sensing capabilities. The cellular phone may not be physically attached to the robot, but may be coupled to the robot wirelessly. For example, a low cost robot may omit a direct connection to the internet. This robot may be able to connect to a user's cellular phone via a wireless technology (e.g., Bluetooth) to be able to access the internet. The robot may be able to access various sensors and communication means of the cellular phone. The robot may not need as many sensors to be physically provided on the robot, however, the robot may be able to keep the same or similar functionality.

Thus, the client device 200 may include mechanical robot features, and may be configured to receive the device 210 (e.g., a mobile phone, smartphone, tablet computer, etc.), which can provide additional peripheral components to the device 200, such as any of an accelerometer, gyroscope, compass, GPS, camera, WiFi connection, a touch screen, etc., that are included within the device 210.

FIG. 2B illustrates a graphical example of a robot 212. In FIG. 2B, the robot 212 is shown as a mechanical form of a person including arms, legs, and a head. The robot 212 may be configured to receive any number of modules or components, such a mobile phone, which may be configured to operate the robot. In this example, a device (e.g., robot 212) can be attached to a mobile phone (e.g., device 210) to provide the mechanical robot 212 with functionality enabling the robot 212 to communicate with the cloud to cause operation/functions of the robot 212. Other types of devices that have connectivity to the Internet can be coupled to robot 212 to provide additional functions on the robot 212. Thus, the device 210 may be separate from the robot 212 and can be attached or coupled to the robot 212.

In one example, the robot 212 may be a toy with only limited mechanical functionality, and by connecting device 210 to the robot 212, the toy robot 212 may now be capable of performing a number of functions with the aid of the device 210 and/or the cloud. In this manner, the robot 212 (or components of a robot) can be attached to a mobile phone to transform the mobile phone into a robot (e.g., with legs/arms) that is connected to a server to cause operation/functions of the robot.

The mountable device 210 may further be configured to maximize runtime usage of the robot 212 (e.g., if the robot 212 could learn what happens to cause the user to turn the toy off or set the toy down, the device 210 may be configured to perform functions to counteract such occurrences).

FIG. 2C illustrates another example of a robot 214. The robot 214 includes an on-board computing system 216, display 218, mechanical actuator 220, and one or more sensors. In some cases, the on-board computing system 216 may be a laptop computer, which may be coupled to the sensors. The sensors may include a camera, infrared projectors, and other motion sensing or vision sensing elements. The mechanical actuator 220 may include a base, wheels, and a motor upon which the on-board computing system 216 and the sensors can be positioned, for example.

Any of the robots illustrated in FIGS. 2A-2C may be configured to operate according to a robot operating system (e.g., an operating system designed for specific functions of the robot). A robot operating system may provide libraries and tools (e.g., hardware abstraction, device drivers, visualizers, message-passing, package management, etc.) to enable robot applications. Examples of robot operating systems include open source software such as ROS (robot operating system), DROS, or ARCOS (advanced robotics control operating system); proprietary software such as the robotic development platform ESRP from Evolution Robotics® and MRDS (Microsoft® Robotics Developer Studio), and other examples may also include ROSJAVA. A robot operating system may include publish and subscribe functionality, and may also include functionality to control components of the robot, such as head tracking, base movement (e.g., velocity control, navigation framework), etc.

Figure 3:
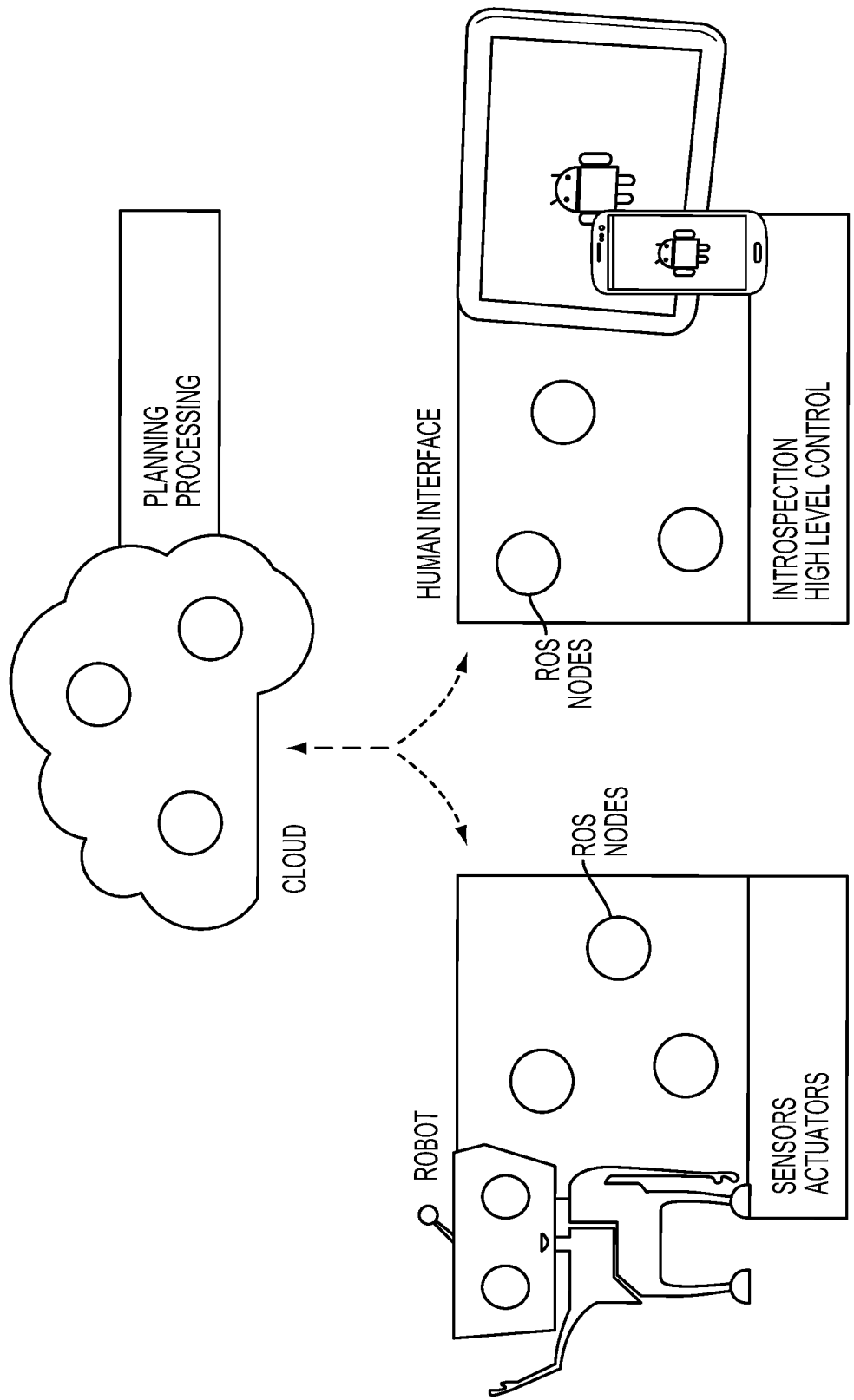
FIG. 3 illustrates example of a conceptual robot-cloud interaction, according to an example embodiment.

FIG. 3 illustrates an example of a conceptual robot-cloud interaction. A robot, such as the robots described and illustrated in FIGS. 2A-2C, may connect to a network of computers (e.g., the cloud), and may request data or processing to be performed by the cloud. In one example, the robot may include a number of sensors and mechanical actuators that may generally provide motor control for the robot. Outputs of the sensors, such as camera feeds, vision sensors, etc., may be provided to the cloud, which can process the outputs to enable the robot to perform functions. The cloud may process a camera feed, for example, to determine a location of a robot, perform object recognition, or to indicate a navigation pathway for the robot.

FIG. 3 generally illustrates motor controllers in which each module may conceptually represent a computer or node on the cloud that performs processing using motor controller inputs or data from the robot. FIG. 3 also generally illustrates sensors in which each module may conceptually represent a computer or node on the cloud that performs processing using sensor inputs or data from the robot. FIG. 3 further generally illustrates applications in which each module may conceptually represent a computer or node on the cloud that performs specific functions of a number of applications, e.g., navigation application, mapping application, etc. In addition, FIG. 3 further generally illustrates planning in which each module may conceptually represent a computer or node on the cloud that performs processing for the robot, such as general planning or computing processing.

As shown, any of the modules may be interconnected, and/or may communicate to receive data or instructions from each other so as to provide a specific output or functionality for the robot.

In one example, the robot may send data to a cloud for data processing, and in another example the robot may receive data from the cloud. The data received from the cloud may be in many different forms. The received data may be a processed form of data the robot sent to the cloud. The received data may also come from sources other than the robot. For example, the cloud may have access to other sensors, other robots, and the Internet.

Figure 4:
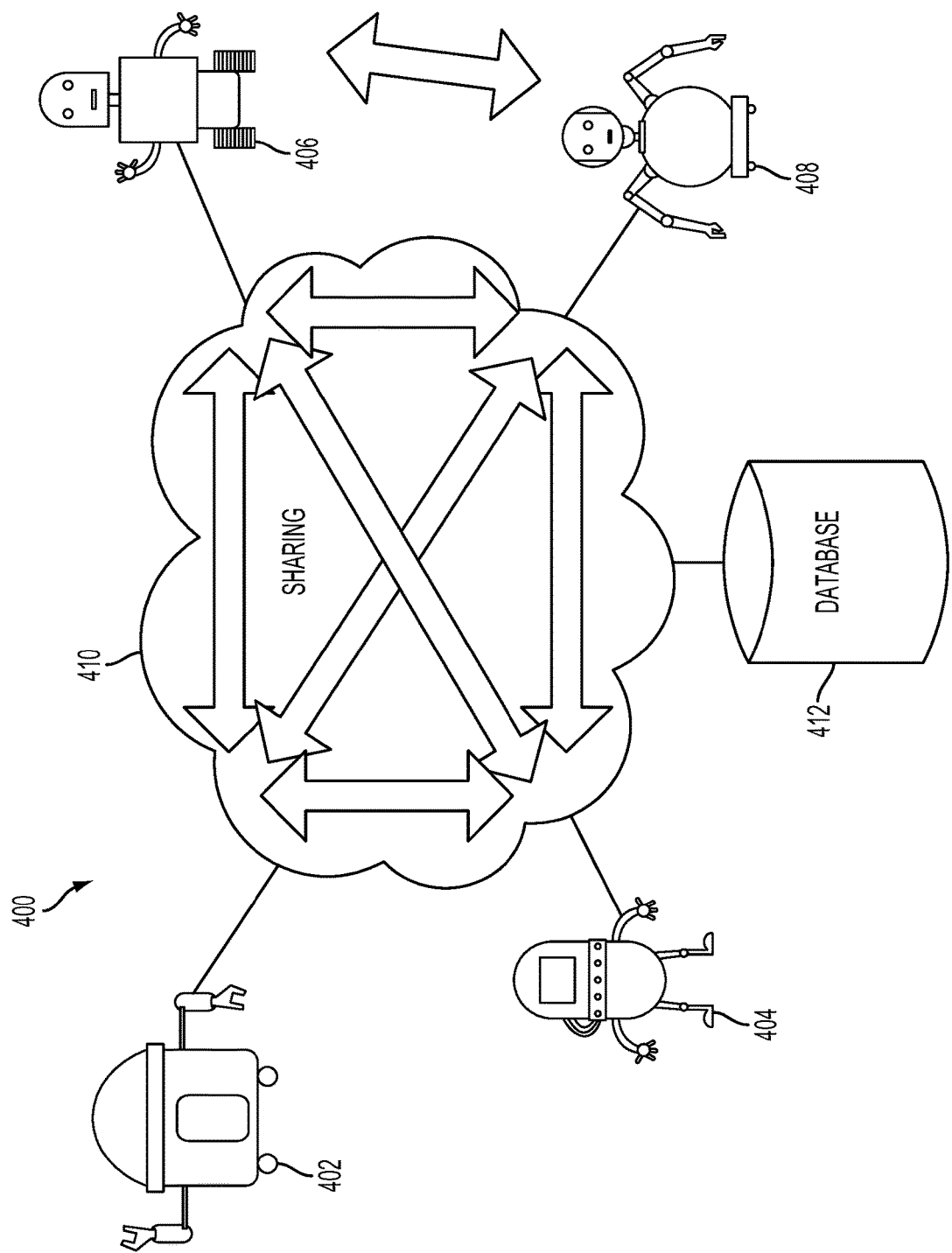
FIG. 4 illustrates an example system in which robots may interact with the cloud and share information with other cloud computing devices, according to an example embodiment.

FIG. 4 is an example system 400 in which robots may interact with the cloud and share information with other cloud computing devices. The system 400 illustrates robots 402, 404, 406, and 408 (e.g., as conceptual graphical representations) each coupled to a cloud 410. Each robot 402, 404, 406, and 408 may interact with the cloud 410, and may further interact with each other through the cloud 410, or through other access points and possibly directly (e.g., as shown between robots 406 and 408).

The cloud 410 may receive input from several robots. Data from each robot may be complied into a larger data set. For example, the robot 402 may take a picture of an object and upload the picture to the cloud 410. An object recognition program on the cloud 410 may be configured to identify the object in the picture and provide data about the recognized object to all the robots connected to the cloud 410, as well as possibly about other characteristics (e.g., metadata) of the recognized object, such as a location, size, weight, color, etc. Thus, every robot may be able to know attributes of an object in a photo uploaded by the robot 402.

The robots 402, 404, 406 and 408 may perform any number of actions within an area, with people, with other robots, etc. In one example, each robot 402, 404, 406 and 408 has WiFi or another network based connectivity and will upload/publish data to the cloud 410 that can then be shared with any other robot. In this manner, each robot 402, 404, 406 and 408 shares experiences with each other to enable learned behaviors. For example, the robot 402 may traverse a pathway and encounter an obstacle, and can inform the other robots 404, 406, and 408 (through the cloud 410) of a location of the obstacle. Each robot 402, 404, 406, and 408 will have access to real-time up to date data. In another example, the robot 404 can download data indicating images seen by the other robots 402, 406, and 408 to help the robot 404 identify an object using various views (e.g., in instances in which the robots 402, 406, and 408 have captured images of the objects from a different perspective).

In still another example, the robot 408 may build a map of an area, and the robot 402 can download the map to have knowledge of the area. Similarly, the robot 402 could update the map created by the robot 408 with new information about the area (e.g., the hallway now has boxes or other obstacles), or with new information collected from sensors that the robot 408 may not have had (e.g., the robot 402 may record and add temperature data to the map if the robot 408 did not have a temperature sensor). Overall, the robots 402, 404, 406, and 408 may be configured to share data that is collected to enable faster adaptation, such that each robot 402, 404, 406, and 408 can build upon a learned experience of a previous robot.

Sharing and adaptation capabilities enable a variety of applications based on a variety of inputs/data received from the robots 402, 404, 406, and 408. In a specific example, mapping of a physical location, such as providing data regarding a history of where a robot has been, can be provided. Another number or type of indicators may be recorded to facilitate mapping/navigational functionality of the robots 402, 404, 406, and 408 (e.g., a scuff mark on a wall can be one of many cues that a robot may record and then rely upon later to orient itself).

In one example, the cloud 410 may include, store, or provide access to a database 412 of information related to objects, and the database 412 may be accessible by all the robots 402, 404, 406, and 408. The database 412 may include information identifying objects, and details of the objects (e.g., mass, properties, shape, instructions for use, etc., any detail that may be associated with the object) that can be accessed by the robots 402, 404, 406, and 408 to perform object recognition. As an example, information regarding use of an object can include, e.g., for a phone, how to pick up a handset, how to answer the phone, location of buttons, how to dial, etc.

In addition, the database 412 may include information about objects that can be used to distinguish objects. For example, the database 412 may include general information regarding an object (e.g., such as a computer), and additionally, information regarding a specific computer (e.g., a model number, details or technical specifications of a specific model, etc.). Each object may include information in the database 412 including an object name, object details, object distinguishing characteristics, etc., or a tuple space for objects that can be accessed. Each object may further include information in the database in an ordered list, for example. In further examples, the database 412 may include a global unique identifier (GUID) for objects identified in the database 412 (e.g., to enable distinguishing between specific objects), and the GUID may be associated with any characteristics or information describing the object. Thus, a robot may be configured to access the database 412 to receive information generally distinguishing objects (e.g., a baseball vs. a computer), and to receive information that may distinguish between specific objects (e.g., two different computers).

The database 412 may be accessible by all robots through the cloud 410 (or alternatively directly accessible by all robots without communication through the cloud 410). The database 412 may thus be a shared knowledge-base stored in the cloud 410.

Thus, in some examples, robots may share learned behaviors through the cloud 410. The cloud 410 may have a server that stores robot learned activities or behaviors resulting in a shared knowledge-base of behaviors and heuristics for object interactions (e.g., a robot "app store"). Specifically, a given robot may perform actions and build a map of an area, and then the robot can upload the data to the cloud 410 to share this knowledge with all other robots. In this example, a transportation of the given robot's "consciousness" can be made through the cloud 410 from one robot to another (e.g., robot "Bob" builds a map, and the knowledge of "Bob" can be downloaded onto another robot to receive knowledge of the map).

Thus, within examples, the robots 402, 404, 406, and 408 may share information through the cloud 410, and may access the database 412.

III. EXAMPLE ROBOT-CLOUD INTERACTION

A cloud-based service, such as cloud service 104, may be configured to conduct large-scale simulations and send instructions to a robotic system for executing a variety of tasks. A task may be simulated across a wide range of possible inputs (e.g., a brute-force search) using information about the robotic system's capabilities, sensor data, and information in the database related to the particular task. Generally, a robotic system may be preconfigured to carry out specific tasks. However, using a cloud-based service may allow a robotic system to learn how to carry out new tasks and to discover new strategies and approaches for interaction with the environment.

Figure 5:
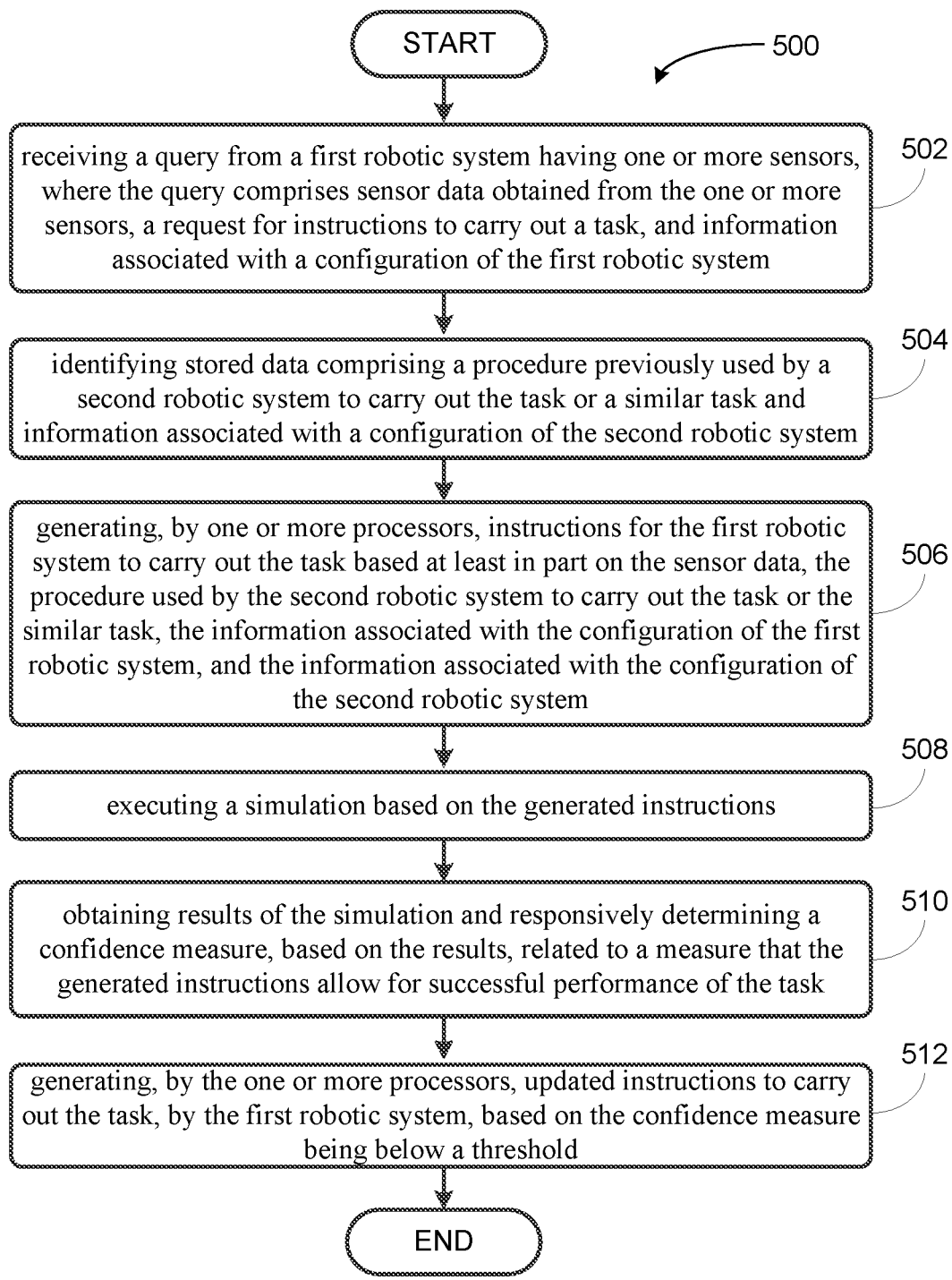
FIG. 5 is a flowchart illustrating a method for robot-cloud interaction, according to an example embodiment.

FIG. 5 is a flowchart illustrating a method 500, according to an example embodiment. Illustrative methods, such as method 500, may be carried out in whole or in part by a component or components in the cloud and/or a robotic system, such as by the one or more of the components of the system 100 shown in FIG. 1, by the one or more of the components of the client device 200 shown in FIG. 2A, by the one or more of the components of the robot 212 shown in FIG. 2B, by the one or more of the components of the robot 214 shown in FIG. 2C, by the one or more components of the conceptual robot-cloud interaction shown in FIG. 3, and by the one or more of the components of the system 400 shown in FIG. 4. However, it should be understood that example methods, such as method 500, may be carried out by other entities or combinations of entities (i.e., by other computing devices and/or combinations of computing devices), without departing from the scope of the invention.

As shown by block 502, method 500 involves receiving a query from a first robotic system having one or more sensors, where the query comprises sensor data obtained from the one or more sensors, a request for instructions to carry out a task, and information associated with a configuration of the first robotic system.

In an example embodiment, the first robotic system (may also be referred to as a robotic device) may acquire data from on-board sensors and other devices such as cameras (e.g., color cameras, grayscale cameras, and/or infrared cameras), a depth sensor (e.g., RGB-D, laser, structured-light, and/or a time-of-flight camera), a motion detector (e.g., an inertial measurement unit (IMU), and/or foot step or wheel odometry), and a range sensor (e.g., ultrasonic and/or infrared), among other possibilities. The acquired data may be processed by an on-board CPU to refine the data and subsequently aggregate and compress (e.g., using delta compression) the data into an arrangement used for a query (e.g., a data packet) sent to the cloud-based service. Once received, an interpretation of the data packet may be distributed among one or more processors. The one or more processors may then work in parallel to interpret the data detected by the sensors (e.g., camera, depth, and/or ranging data), and responsively send the detection results to a central server.

The central server may aggregate the detection results received from the one or more processors and match the results against a database of information (e.g., database 110) that contains metadata of objects, people, sounds, and images, among other possibilities. Matching the results against the database of information may involve Bayesian probability techniques such that the central server can assign, for instance, confidence values to possible objects/people, thereby resulting in a sorted rank list of possible objects/people that the first robotic system may be interacting with in the environment. The sorted rank list may include metadata associated with the possible objects/people (e.g., a geometric model of an object, historical data associated with an object, an object's material properties). Such a configuration may allow the first robotic system to cross-reference detections from the environment against a database of information located on a cloud server.

In addition to the data obtained from the on-board sensors, the query may also include a request for instructions from the cloud-based service that may allow the first robotic system to essentially learn how to interact with the environment (i.e., by carrying out a specific task). The request for instructions to carry out the task may include: a request for a 3D model of an object, a request for object grasp strategies, a request for operation manuals, a request for optical character recognition (OCR) over obtained images, and a request for etiquette tips, among other examples.

Additionally, the query may also include robot-specific data that may be information specific to the configuration of the robotic system making the request (i.e., the first robotic system). Such information associated with the configuration of the first robotic system may include information related to: on-board sensors, on-board processors, on-board power system, control system, and end effectors, among others. For example, an end effector may be a gripper or a tool. In the case of a gripper, end effector information may include the type of gripper (e.g., a two-finger gripper), the model of the gripper, and/or the position of the gripper in the robotic system, among other possibilities. In the case of a tool, end effector information may include the type of tool and/or purpose of the tool (e.g., surgical operation), among others possibilities. Other examples may also be possible.

As shown by block 504, method 500 involves identifying stored data comprising a procedure previously used by a second robotic system to carry out the task or a similar task and information associated with a configuration of the second robotic system.

As mentioned above, multiple robotic systems (e.g., robots 402, 404, 406 and 408) may share experiences with each other to enable learned behaviors. In this manner, once the cloud-based service has interpreted the request for instructions to carry out the task, the cloud-based service may identify a procedure previously used by a second robotic system to carry out the task (or a similar task). Additionally, the cloud-based service may identify information associated with the configuration of the second robotic system.

In one case, the first and second robotic systems may be the same (e.g., the same robot configuration). In another case, the first and second robotic systems may be different. For instance, the robotic systems may differ in the number of end effectors used, the types of end effectors used, and/or the location of the end effectors in the robotic system configuration, among other possibilities. Other examples may also be possible.

Consider a scenario where the request for instructions involves a request for instructions to grasp an object that the first robotic system has not previously encountered. The cloud-based service may first determine what the object is (e.g., using the matching techniques) and obtain a geometric model of the object, historical data associated with an object, and/or an object's material properties, among others. Once the object has been determined, the cloud-based service may identify one or more procedures stored in the database 110 used by other robotic systems to grasp the object at issue.

In one case, the cloud-based service may first attempt to identify the one or more procedures based on the robotic system configuration. In particular, the cloud-based service may identify other robotic systems with the same (or similar) configuration as the first robotic system and subsequently determine if any of the identified robotic systems have previously grasped the object at issue. If the cloud-based service identifies robotic systems that have previously grasped the object at issue, the cloud-based service may further sort the procedures used to grasp the object based on factors such as success rate and efficiency, among others.

In another case, the cloud-based service may first attempt to identify the one or more procedures regardless of the robotic system configuration. For example, the cloud-based service may identify any procedure stored in the database 110 used to grasp the object at issue. Subsequently, the cloud-based service may identify, among the robotic systems carrying out the identified procedures, robotic systems that have the same (or similar) configurations to the configuration of the first robotic system. Note that other factors and sequences may also be used to identify the procedures.

As shown by block 506, method 500 involves generating, by one or more processors, instructions for the first robotic system to carry out the task based at least in part on the sensor data, the procedure used by the second robotic system to carry out the task or the similar task, the information associated with the configuration of the first robotic system, and the information associated with the configuration of the second robotic system.

The cloud-based service may be configured to conduct large-scale simulations in order to generate the instructions requested by the first robotic system. Such instructions may be generated based on factors such as the sensor data obtained from the first robotic system, the identified procedure used by the second robotic system, the configurations of the first and second robotic systems, among others. Note that the instructions may be generated in a format readable by the first robotic system.

For the purpose of explanation only, consider again the scenario where the request for instructions involves a request for instructions to grasp an object that the first robotic system has not previously encountered. The cloud-based service may compute an optimal grasping strategy based on various factors. The factors may involve, for example, uncertainties of friction based on the object's material properties and the end effector capabilities of the first robotic system. The factors may also involve, for example, motion strategies based on object location data received from the on-board sensors as well as robot-specific control system data. Other factors may also be possible.

In one case, the object at issue may be correctly identified by the cloud-based service (e.g., within a threshold of certainty). In this case, as mentioned above, the cloud-based service may identify one or more procedures stored in the database 110 used by other robotic systems to grasp the object. One of the procedures may be selected based on factors including, for example, success rate and efficiency such that the first robotic system is provided with the highest likelihood of successfully grasping the object.

Note that success rate may be defined by the ratio of a successful number of attempts to an overall number of attempts, among other options. Additionally, note that efficiency may be defined based on duration for a successful completion of a task (i.e., a shorter duration being more efficient), among other options.

If the selected procedure was carried out by a robotic system (i.e., the second robotic system) that has the same configuration as the first robotic system, the cloud-based service may generate the instruction solely based on the selected procedure. That is, the generated instructions may provide the exact same procedure since the robotic system configurations are the same. However, if the selected procedure was carried out by a robotic system (i.e., the second robotic system) that has a configuration different than the configuration of the first robotic system, the cloud-based service may evaluate the differences between the configurations and generate the instructions while taking the differences into account.

In one example, the first robotic system may be equipped with two end effectors including a drill and a three-finger gripper. In contrast, the second robotic system may have the same configuration as the first robotic system except for being equipped with two end effectors including two three-finger grippers. If the second robotic system used both its end effectors to grasp the object, the cloud-based service may generate instructions for the first robotic system to grasp the object using a similar procedure used by the second robotic system while taking the difference between the end effectors into account. In particular, the cloud-based service may conduct a simulation to determine how the first robotic system can use a single three-finger gripper rather than two such grippers to grasp onto the object at issue. The result of such a simulation may determine, for example, that the first robotic system can use the exact same procedure used by the second robotic system (e.g., same motion strategy) while determining a different force needed to grip the object using a single three-finger gripper rather than two three-finger grippers.

Generally, the force (F) needed to grip an object may be determined using several factors such as: the coefficient of friction ($\mu$) between the object and the fingers, the number of fingers of the gripper contacting the object (n), weight of the object (W), and a gravitational multiplication factor (g) that depends on the direction of movement of the object relative to gravity. In particular, the force (F) needed to grip an object may be computed by dividing the product of the weight of the object (W) and the gravitational multiplication factor (g) by the product of the coefficient of friction ($\mu$) and the number of fingers (n). i.e., $F=[W*g]/[\mu*n]$.

As such, the cloud-based service may determine that the situation encountered by the first robotic system involves the same coefficient of friction ($\mu$), the same weight of the object (W), and the same gravitational multiplication factor (g). However, using a single three-finger gripper rather than two three-finger grippers results in a different number of fingers contacting the object (n). Given this information, the cloud-based service may use the computational formula to calculate the force needed to grip the object (F) when three fingers contact the object rather than six fingers. In this case, the force needed to grip the object (F) doubles when the number of fingers contacting the object (n) is halved. As a result, the cloud-based service may then generate the instructions based on the procedure used by the second robotic system while taking into account the force needed to grip the object given the difference in end effector capabilities.

In another example, differences between the configurations of the robotic systems may involve differences in the types (or number) of sensors the robotic systems are equipped with. For instance, the first robotic system may be equipped with a grayscale camera. In contrast, the second robotic may be equipped with a color camera. In this instance, the sensor data obtained from the first robotic system (e.g., image data of the object at issue) may include grayscale image data and the first robotic system may be configured to interpret only grayscale image data.

The cloud-based service may determine the difference in camera types and may generate the instructions based on the difference. In particular, the cloud-based service may determine that the stored data comprising the procedure previously used by the second robotic system includes color image data (e.g., color image data associated with the object as obtained by the second robotic system). Upon determining that the stored data include such color image data, the cloud-based service may use various techniques (currently known or developed in the future) to convert the color image data to grayscale image such that the generated instructions can be readable and properly carried out by the first robotic system.

In another instance, the first robotic system may be equipped with an infrared range sensor. In contrast, the second robotic system may be equipped with an ultrasonic range sensor. In this instance, the sensor data obtained from the first robotic system (e.g., proximity of the object at issue) may include reflected infrared light data and the first robotic system may be configured to interpret only such infrared light data.

The cloud-based service may determine the difference in range sensor types and may generate the instructions based on the difference. In particular, the cloud-based service may determine that the stored data comprising the procedure previously used by the second robotic system includes ultrasonic sound data (e.g., representing distance(s) between the object and the second robotic system while carrying out the procedure). Upon determining that the stored data includes such ultrasonic sound data, the cloud-based service may convert the ultrasonic sound data to range data (e.g., a particular distance) and then further convert the range data to corresponding infrared light data. In this manner, the generated instructions can be readable and properly carried out by the first robotic system.

In another example, differences between the configurations of the robotic systems may involve differences in movement capabilities of the robotic systems. For instance, the first robotic system may be equipped with robot leg links of a first length. In contrast, the second robotic system may be equipped with robot leg links of a second length (e.g., twice as large as the first length). In this instance, due to the differences in the lengths, the first robotic system may need to take more steps than the second robotic system to cover the same distance.

The cloud-based service may determine the difference in the lengths of the robot leg links and may generate the instructions based on the difference. In particular, the cloud-based service may determine that the stored data comprising the procedure previously used by the second robotic system includes data representing, for example, six steps taken by the robotic system to reposition the object. Upon determining that the stored data include such data, the cloud-based service may convert the number of steps taken by the second robotic system to the number of steps that the first robotic system needs to take (e.g., twelve steps) to cover the same distance given the information that the second length is twice as large as the first length. In this manner, the generated instructions can be readable and properly carried out by the first robotic system. Other examples may also be possible.

In some cases, the object at issue may not be correctly identified by the cloud-based service within a threshold of certainty. In this case, the cloud-based service may identify a similar object based on similarity in the geometric model of the object and/or the object's material properties, among other possibilities. Once a similar object has been identified, the above techniques may be applied while taking into account the differences between the identified similar object and the object at issue (e.g., differences in weight of the object (W) and/or coefficient of friction ($\mu$)).

Note that the above techniques are not limited to object grasp strategies and may be used in the context of any request for instructions from a robotic system. Additionally, note that the cloud-based service may use any combination of identified procedures to generate the instructions (i.e., rather than a single identified procedure).

As shown by block 508, method 500 involves executing a simulation based on the generated instructions.

Once the instructions to carry out the task have been generated, the cloud-based service may send the generated instructions to the first robotic system. Additionally, the cloud-based service may send a command to the first robotic system including a request to execute an on-board simulation using the generated instructions. In particular, the cloud-based service may request for the on-board simulation to be executed prior to the first robotic system carrying out the task. In this manner, the first robotic system won't carry out the task before verifying that the generated instructions are appropriate.

Note that the generated instructions and the command may be sent simultaneously or may be sent separately. Additionally, note that the cloud-based service may also send a request for results of the on-board simulation.

The on-board simulation may be executed by an on-board computing device (e.g., processor 202) positioned on the first robotic system. In an example implementation, the on-board simulation may involve a simulation of the generated instructions in whole or in part. For example, the first robotic system may execute an on-board simulation to determine (or predict) the outcome of using the calculated force needed to grip the object (F) in order to grasp the object at issue. Upon completion of the on-board simulation, results of the on-board simulation may be generated in a format readable by the cloud-based service.

In some implementations, the cloud-based service may not send a command to the first robotic system including a request to execute an on-board simulation using the generated instructions. In this case, the cloud-based service may conduct such a simulation (i.e., prior to the first robotic system carrying out the task) in order to verify that the generated instructions are appropriate. Upon determining results of the simulation (and optionally using the confidence measure determination discussed below), the cloud-based service may send instructions to the first robotic system to carry out the task. Other implementations may also be possible.

As shown by block 510, method 500 involves obtaining results of the simulation and responsively determining a confidence measure, based on the results, related to a measure that the generated instructions allow for successful performance of the task.

Upon receiving results of the on-board simulation, the cloud-based service may determine a confidence measure related to a measure of the likelihood that the generated instructions allow for successfully carrying out the task at issue. For instance, the cloud-based service may determine a confidence measure associated with successful grasp of the object. Various factors may be considered in determining the confidence measure.

In one example, the confidence measure may be determined based on a comparison of the simulation results to expected simulation results. For instance, the cloud-based service may conduct a simulation to determine expected results and evaluate the differences between the expected results and the actual results of the on-board simulation (e.g., comparing simulated efficiency to expected efficiency). In another example, the confidence measure may be determined based on a comparison of the simulation results to simulation results stored in the database 110 associated with procedures used by other robotic systems to carry out the task or a similar task (e.g., comparing simulated efficiency to the average efficiency of the procedures). In yet another example, the confidence measure may be determined by the first robotic system (i.e., rather than by the cloud-based service) as part of the on-board simulation. Other examples may also be possible.

Note that the confidence measure may be in the form of a rating (e.g., between 1-10 where 10 indicates a high confidence measure and 1 indicates a low confidence measure) or an indicator (e.g., an indicator representing "high confidence", "average confidence", or "low confidence"), among other possibilities.

As shown by block 512, method 500 involves generating, by the one or more processors, updated instructions to carry out the task, by the first robotic system, based on the confidence measure being below a threshold.

If the cloud-based service determines that the confidence measure is below a threshold measure, the cloud-based service may generate updated instructions to carry out the task. Alternatively, the cloud-based service may update the previously generated instructions. The threshold measure may be predetermined or may continuously update based on, for example, historical confidence measures stored in the database 110, among other possibilities.

Generating updated instructions may involve a simulation by the cloud-based service to determine a change in the instructions (e.g., selecting from a set of stored instructions for robot commands and/or adjusting control loop parameters for the set of instructions) that may lead to a higher confidence measure. For example, referring back to the scenario where the request for instructions involves a request for instructions to grasp an object, results of the on-board simulation may indicate that the calculated force needed to grip the object (F) is insufficient to properly grasp the object. In particular, the results of the on-board simulation may indicate that the first robotic system grasping onto the object using the calculated force may result in the object sliding away from the first robotic system's end effector and falling to the ground. As such, the cloud-based service may generate updated instructions indicating that the first robotic system should use a larger force to grip the object.

As one example, generating instructions at block 512 can include changing a set of stored instructions and/or synthesizing a new instructions. For example, a stored library of motion or control strategies may include instructions and/or parameterized templates of instructions. At block 512, those instructions can be selected and parameters changed and/or a template can be selected and parameters set, with the simulation results used to compare selections and to tune parameters. Instructions for new motions can be synthesized by combining multiple sets of instructions (or templates) from the library and simulating to evaluate suitability and overall robustness. Instructions can be generated in any other suitable way as well.

Subsequently, the cloud-based service may send the generated updated instructions to the first robotic system. Additionally, the cloud-based service may also send another command to execute another on-board simulation based on the generated updated instructions. Such an iterative procedure may be illustrated by flowchart 600 of FIG. 6. Note that some steps of flowchart 600 may be eliminated and other steps may be added without departing from the scope of the invention disclosed herein. Additionally, note that the various steps of flowchart 600 may be carried out in any order and may be implemented as part of method 500 in any manner. In particular, steps 602-610 of flowchart 600 illustrate an iterative procedure conducted by the cloud-based service to generate updated instructions until the confidence measure is above a threshold measure. Such an iterative procedure may take the form of repeating the procedure discussed above in association with blocks 508-512 of method 500 in whole or in part.

Step 602 of flowchart 600 involves the cloud-based service determining the confidence measure. The determination of the confidence measure may be carried out as discussed above in association with block 510 of method 500 or may be carried out in any other manner.

Step 604 of flowchart 600 involves, upon determination of the confidence measure, the cloud-based service determining whether the confidence measure is above a threshold measure. The determination of whether the confidence measure is above a threshold measure may be carried out as discussed above in association with block 512 of method 500 or may be carried out in any other manner.

Step 606 of flowchart 600 involves, upon determination that the confidence measure is below a threshold measure, the cloud-based service updating the previously generated instructions (or generating updated instructions). The generation of updated instructions may be carried out as discussed above in association with block 512 of method 500 or may be carried out in any other manner. Also, note that step 606 may be carried out using any of the techniques for generating instructions as discussed above in association with block 506 of method 500.

Step 608 of flowchart 600 involves the cloud-based service sending to the robotic system (i.e., the first robotic system), upon updating the generated instructions, (i) the updated generated instruction and (ii) a command to execute another on-board simulation. Additionally, the cloud-based service may also send a request for results of the subsequent on-board simulation. Sending such information may be carried out as discussed above in association with block 508 of method 500 or may be carried out in any other manner.

Step 610 of flowchart 600 involves the cloud-based service receiving results of the subsequent on-board simulation. Receiving the results of the subsequent on-board simulation may be carried out as discussed above in association with block 510 of method 500 or may be carried out in any other manner. Upon receiving the results, the cloud-based service may again carry out step 602 of flowchart 600 to determine the confidence measure based on the results of the subsequent on-board simulation. Once the confidence measure is determined, the cloud-based service may again carry out step 604 of flowchart 600 to determine whether the confidence measure is above the threshold measure. If the confidence measure is below the threshold measure, the cloud-based service may again repeat steps 606-610 of flowchart 600.

Such an iterative procedure involving step 602-610 may repeat until the confidence measure is above the threshold measure. Alternatively, the cloud-based service may conduct a limited number of iterations (e.g., three iterations). Upon completing the limited number of iterations, the cloud-based service may send a message to the robotic system. Such a message may include an indication that the cloud-based service is unable to generate instructions that allow for a higher likelihood of successfully carrying out the task. In this case, the robotic system may be directed to use the generated instructions regardless (given that the generated instructions don't result in unintended consequences). Additionally or alternatively, the cloud-based service may send, to the robotic system, a request for additional information (e.g., additional sensor data) needed to generate instructions that may result in a confidence measure being above the threshold measure. Upon receiving such additional information, the cloud-based service may proceed to repeat the techniques of method 500 and/or flowchart 600 in whole or in part.

Referring back to step 604 of flowchart 600. If the confidence measure is above the threshold measure, the cloud-based service may proceed to step 612 of flowchart 600. Step 612 involves the cloud-based service sending a confirmation message to the robotic system. The confirmation message may indicate that the generated instructions allow for successful performance of the task. The confirmation message may also include an indication that the robotic system can proceed with carrying out the task using the generated instructions. Additionally, step 614 involves the cloud-based service sending a request for a report related to performance of the task (i.e., once the robotic system carries out the task).

In one case, such a request may be sent along with the confirmation message (i.e., combining steps 612 and 614). In another case, such a request may be sent separately from the confirmation message and prior to the robotic system carrying out the task. In yet another case, such a request may be sent after the robotic system carries out the task. In yet another case, the cloud-based service may not send the request indicated in step 614 and the process may end upon completion of step 612. Other cases may also be possible.

Step 616 of flowchart 600 involves, upon receiving the report from the robotic system, determining whether the report indicates successful or unsuccessful performance of the task. For instance, referring back to the scenario where the request for instructions involves a request for instructions to grasp an object, successful performance of the task may involve the robotic system successfully grasping onto the object. In contrast, unsuccessful performance of the task may involve an indication that, for example, the robotic system was unable to successfully grasp onto the object. If the report indicates unsuccessful performance of the task, the cloud-based service may return to step 606 in order to update the generated instructions based on the received report. For example, the report may indicate that the calculated force was insufficient to successfully grasp onto the object and the cloud-based service may update the generated instructions by updating the calculated force. Other examples may also be possible.

Alternatively, if the report indicates unsuccessful performance of the task, the cloud-based service may communicate with the robotic system to receive a new (or updated) query related to new environmental conditions experienced by the robotic system. For example, this may be desirable if, upon an attempt to grasp the object, the object's position has changed. As such, a new query may be needed that includes a new request for instructions to carry out the task (i.e., grasp onto the object given the object's new position), updated sensor data representing the new environmental conditions experienced by the robotic system, and/or updated information associated with the configuration of the robotic system (e.g., updated position of a robotic arm), among other possibilities.

In contrast, if the report indicates successful performance of the task, the cloud-based service may proceed to step 618 of flowchart 600. Step 618 involves storing the received report and/or the generated instruction in the database (e.g., database 110). Storing such information in the database may allow the robotic system or other robotic systems to access the information in the future. The robotic system or other robotic systems may then use the techniques described herein to repeat the task and/or learn how to carry out new tasks and to discover new strategies and approaches for interaction with the environment. Note that such information may be stored in one or more formats readable by other robotic systems and/or other client devices.

Further, step 620 of flowchart 600 involves the cloud-based service sending, to the robotic system, an indication to store the generated instructions (e.g., at memory storage 204). Storing the generated instructions may allow for faster accessibility to the generated instructions by the robotic system. This may be especially desirable in situations where a robotic system cannot communicate with the cloud-based service, among other possible situations.

Figure 6:
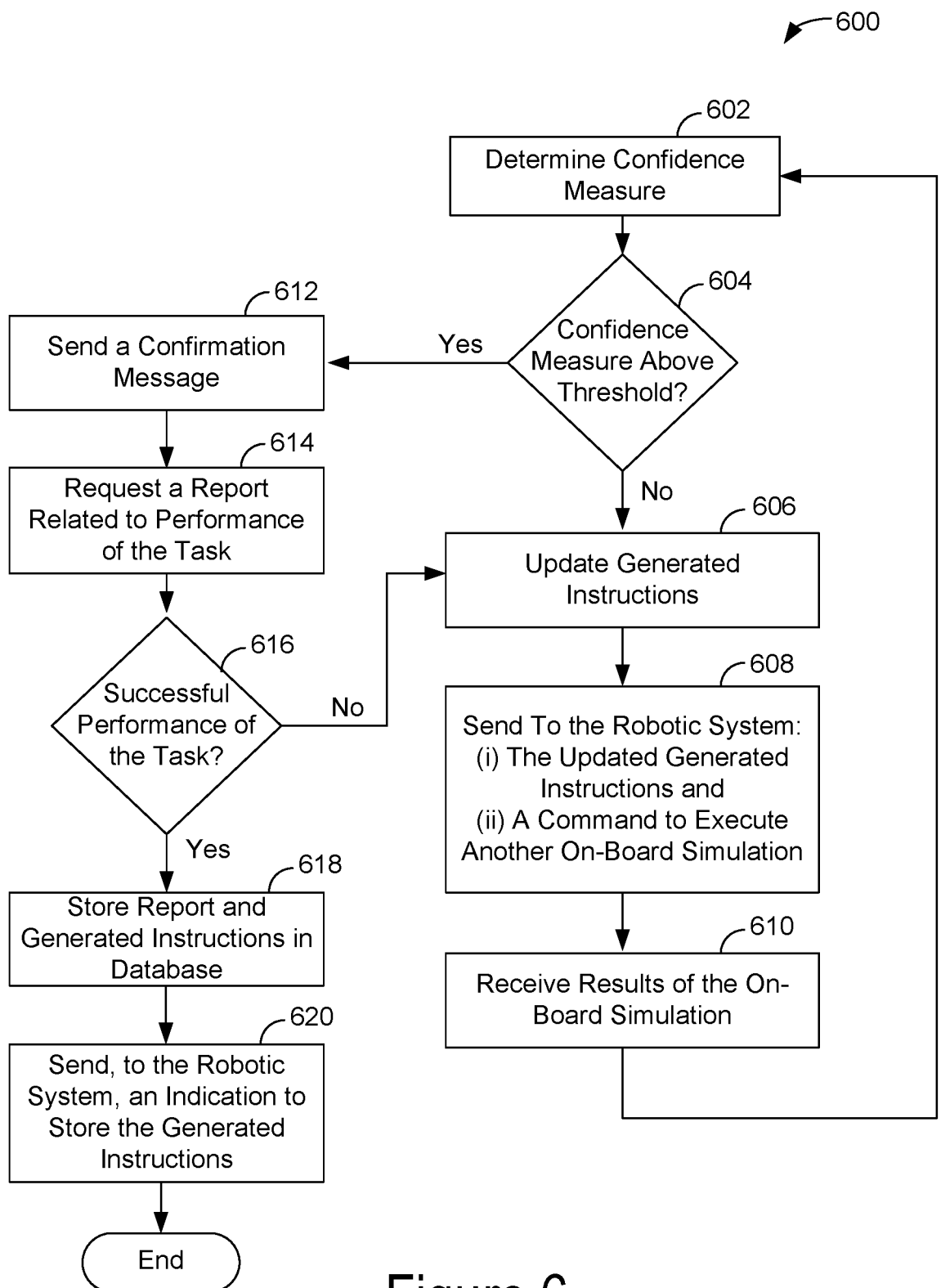
FIG. 6 is a flowchart illustrating an iterative procedure for robot-cloud interaction, according to an example embodiment.

Note that steps 618 and 620 may occur in any order. Additionally, note that one or more of steps 618 and 620 may not be carried out by the cloud-based service. In this case, the process illustrated by flowchart 600 may end upon completion of step 616. In another case, if the cloud-based service carries out step 618 but does not carry out step 620, the process illustrated by flowchart 600 may end upon completion of step 618. In yet another case, if the cloud-based service carries out step 620 but does not carry out step 618, the process illustrated by flowchart 600 may end upon completion of step 620. In yet another case, as shown in FIG. 6, if the cloud-based service carries out both steps 618 and step 620, the process illustrated by flowchart 600 may end upon completion of step 618 and 620. Other cases and examples may also be possible.

In an example implementation, the cloud-based service may also assist a robotic system with other tasks such as human-robot interaction. For instance, data from one or more on-board sensors may be used by the cloud-based service for human recognition and interaction using one or more of the techniques discussed above. In particular, the cloud-based service may carry out functions such as face detection, interpretation of gestures, evaluation of walking habits, determination of a particular body shape, analysis of a human's tone of voice. Data received from each sensor may weight differently for carrying out such functions (e.g. speech data may be weighted heavily compared to other sensor data). Additionally, the sensor data may be aggregated and confidence values for human recognition may be determined such that the robotic system can correctly recognize a person and interact accordingly.

In a further aspect, humans can teach a robotic system metadata about objects/people that the robotic system can remember by storing the information in the database 110. In one example, a first person may "introduce" the robotic system to a new person. Responsively, the robotic system may send information about the new person (e.g., face image, gestures, walk habits body shape information, tone of voice) to the cloud-based service such that a new record is created that is associated with the new person. In another example, a person may point to a new object in the environment and the robotic system may send information about the new object to the cloud-based service such that a new record is created that is associated with the new object.

Any information stored in the database of the cloud-based service may be accessible in the future by the robotic system (or other robotic systems) to assist the robotic system with human and object interaction. An example situation may involve a robotic system (e.g., a humanoid robot) interacting with an elderly person. The elderly person may show photo albums to the humanoid robot and may simultaneously describe memories associated with the photo albums. The humanoid robot may store information associated with the interaction in the database and later access the information, for example, during a future interaction (e.g., with another person related to the elderly person). In other words, a robotic system may associate previously stored information with a current environment interaction using information stored in the cloud.

Another example situation of human-robot interaction may involve a person asking a robotic system a question and the robotic system may responsively request information from the cloud-based service and provide an answer to the question. Other examples may also be possible.

IV. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

We claim:

1. A method comprising:
receiving, by one or more processors from a first robotic system, a request for instructions to carry out a task;
generating, by the one or more processors, the instructions for the first robotic system to carry out the task based at least in part on a procedure previously used by a second robotic system to carry out the task or a similar task, wherein the instructions adapt the procedure previously used by the second robotic system to the first robotic system based on one or more of (i) a difference between the first robotic system and the second robotic system or (ii) a difference between the task and the similar task;
performing, by the one or more processors, a simulation of execution of the instructions by the first robotic system;
determining, by the one or more processors and based on the simulation, a confidence measure indicating whether or not the instructions allow for successful performance of the task by the first robotic system;
in response to the confidence measure indicating that the instructions do not allow for successful performance of the task: (i) modifying, by the one or more processors and based on the simulation, the instructions, (ii) performing, by the one or more processors, an updated simulation of execution of the instructions as modified, and (iii) updating, by the one or more processors, the confidence measure based on the updated simulation; and
in response to the confidence measure indicating that the instructions as modified allow for successful performance of the task, causing, by the one or more processors, the first robotic system to carry out the task in accordance with the instructions as modified.

2. The method of claim 1, wherein the request includes sensor data obtained from one or more sensors of the first robotic system, and wherein generating the instructions for the first robotic system to carry out the task is further based on the sensor data.

3. The method of claim 1, wherein the request indicates a configuration of the first robotic system, and wherein generating the instructions for the first robotic system to carry out the task is further based on the configuration of the first robotic system.

4. The method of claim 3, wherein a configuration of the second robotic system is the same as the configuration of the first robotic system.

5. The method of claim 3, wherein a configuration of the second robotic system is different from the configuration of the first robotic system.

6. The method of claim 5, wherein the configuration of the first robotic system comprises a first set of end effectors, wherein the configuration of the second robotic system comprises a second set of end effectors, wherein the first set of end effectors is at least partially different than the second set of end effectors, and wherein generating the instructions for the first robotic system to carry out the task further comprises:
determining the difference between the first robotic system and the second robotic system based on the first set of end effectors and the second set of end effectors.

7. The method of claim 5, wherein the configuration of the first robotic system comprises a first set of sensors, wherein the configuration of the second robotic system comprises a second set of sensors, wherein the first set of sensors is at least partially different than the second set of sensors, and wherein generating the instructions for the first robotic system to carry out the task further comprises:
determining the difference between the first robotic system and the second robotic system based on the first set of sensors and the second set of sensors.

8. The method of claim 5, wherein the configuration of the first robotic system results in a first set of movement capabilities, wherein the configuration of the second robotic system results in a second set of movement capabilities, wherein the first set of movement capabilities is at least partially different than the second set of movement capabilities, and wherein generating the instructions for the first robotic system to carry out the task further comprises:
determining the difference between the first robotic system and the second robotic system based on the first set of movement capabilities and the second set of movement capabilities.

9. The method of claim 1, wherein the task comprises an interaction with an object, and wherein the request for the instructions comprises one or more of: a request for recognition of the object, a request for a 3D model of the object, and a request for a strategy to grasp the object.

10. The method of claim 1, wherein performing the simulation comprises:
sending, to the first robotic system, at least a portion of the instructions and a command to perform at least a portion of the simulation prior to carrying out the task; and
receiving, from the first robot system, results of at least the portion of the simulation.

11. The method of claim 1, further comprising:
after the first robotic system carries out the task in accordance with the instructions as modified, receiving, by the one or more processors from the first robotic system, a report related to performance of the task.

12. The method of claim 11, further comprising:
determining that the received report indicates successful performance of the task; and
in response to determining that the received report indicates successful performance of the task, storing, by the one or more processors, at least the instructions as modified in a database.

13. The method of claim 11, further comprising:
determining that the received report indicates successful performance of the task; and
in response to determining that the received report indicates successful performance of the task, sending, by the one or more processors to the first robotic system, an indication to store the instructions as modified at a memory storage of the first robotic system.

14. The method of claim 11, further comprising:
determining that the received report indicates unsuccessful performance of the task; and
in response to determining that the received report indicates unsuccessful performance of the task, generating, by the one or more processors, updated instructions for the first robotic system to carry out the task,
wherein generating the updated instructions is based at least on the received report.

15. The method of claim 1, wherein determining the confidence measure comprises:
obtaining first results of one or more prior simulations of performance of one or more procedures to carry out the task or the similar task by at least one robotic system other than the first robotic system; and comparing (i) second results of the simulation of execution of the instructions by the first robotic system to (ii) the first results to determine the confidence measure.

16. A non-transitory computer readable medium having stored therein instructions executable by one or more processors to cause the one or more processors to perform functions comprising:
receiving, from a first robotic system, a request for instructions to carry out a task;
generating the instructions for the first robotic system to carry out the task based at least in part on a procedure previously used by a second robotic system to carry out the task or a similar task, wherein the instructions adapt the procedure previously used by the second robotic system to the first robotic system based on one or more of (i) a difference between the first robotic system and the second robotic system or (ii) a difference between the task and the similar task;
performing a simulation of the first robotic system executing the instructions;
determining, based on the simulation, a confidence measure indicating whether or not the instructions allow for successful performance of the task by the first robotic system;
in response to the confidence measure indicating that the instructions do not allow for successful performance of the task: (i) modifying the instructions based on the simulation, (ii) performing an updated simulation of execution of the instructions as modified, and (iii) updating the confidence measure based on the updated simulation; and
in response to the confidence measure indicating that the instructions as modified allow for successful performance of the task, causing the first robotic system to carry out the task in accordance with the instructions as modified.

17. The non-transitory computer readable medium of claim 16, wherein the request indicates a first configuration of the first robotic system, wherein the second robotic system has a second configuration that is different from the first configuration, and wherein generating the instructions for the first robotic system to carry out the task is further based on the first and second configurations.

18. The non-transitory computer readable medium of claim 16, wherein determining the confidence measure comprises:
obtaining first results of one or more prior simulations of performance of one or more procedures to carry out the task or the similar task by at least one robotic system other than the first robotic system; and
comparing (i) second results of the simulation of execution of the instructions by the first robotic system to (ii) the first results to determine the confidence measure.

19. A cloud-based system comprising:
a communication interface; and
one or more server devices configured to:
receive, from a first robotic system via the communication interface, a request for instructions to carry out a task;
generate the instructions for the first robotic system to carry out the task based at least in part on a procedure previously used by a second robotic system to carry out the task or a similar task, wherein the instructions adapt the procedure previously used by the second robotic system to the first robotic system based on one or more of (i) a difference between the first robotic system and the second robotic system or (ii) a difference between the task and the similar task;
perform a simulation of the first robotic system executing the instructions;
determine, based on the simulation, a confidence measure indicating whether or not the instructions allow for successful performance of the task by the first robotic system;
in response to the confidence measure indicating that the instructions do not allow for successful performance of the task: (i) modify, based on the simulation, the instructions, (ii) perform an updated simulation of execution of the instructions as modified, and (iii) update the confidence measure based on the updated simulation; and
in response to the confidence measure indicating that the instructions as modified allow for successful performance of the task, cause the first robotic system to carry out the task in accordance with the instructions as modified.

20. The cloud-based system of claim 19, wherein the request indicates a first configuration of the first robotic system, wherein the second robotic system has a second configuration that is different from the first configuration, and wherein generating the instructions for the first robotic system to carry out the task is further based on the first and second configurations.

* * * * *